(12) United States Patent
Takemoto (10) Patent No.: US 9,964,787 B2
(45) Date of Patent: May 8, 2018

(54) DISPLAY DEVICE HAVING FRAMES

(71) Applicant: Japan Display Inc., Tokyo (JP)

(72) Inventor: Kimiyoshi Takemoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 63 days.

(21) Appl. No.: 14/946,022

(22) Filed: Nov. 19, 2015

(65) Prior Publication Data
US 2016/0147108 A1    May 26, 2016

(30) Foreign Application Priority Data

Nov. 20, 2014 (JP) .................................. 2014-235800
Nov. 18, 2015 (JP) .................................. 2015-226097

(51) Int. Cl.
G02F 1/1333 (2006.01)
F21V 8/00 (2006.01)
G02F 1/1345 (2006.01)

(52) U.S. Cl.
CPC ..... *G02F 1/133308* (2013.01); *G02B 6/0086* (2013.01); *G02F 1/13452* (2013.01); *G02F 2001/13332* (2013.01); *G02F 2001/133314* (2013.01); *G02F 2001/133317* (2013.01); *G02F 2201/465* (2013.01)

(58) Field of Classification Search
CPC ......... G02F 2201/465; G02F 1/133308; G02F 1/13332; G02F 1/133314; G02F 1/133317
USPC ..................................... 362/632–633; 349/58
See application file for complete search history.

(56) References Cited

U.S. PATENT DOCUMENTS

| 2005/0073622 A1* | 4/2005 | Kitaka | G02F 1/133308 349/58 |
| 2006/0178267 A1* | 8/2006 | Kim | B29C 45/0025 503/227 |
| 2007/0132908 A1* | 6/2007 | Kim | G02F 1/133308 349/58 |
| 2007/0157487 A1* | 7/2007 | Hyun | G02F 1/133308 36/118.9 |

(Continued)

FOREIGN PATENT DOCUMENTS

JP 2011002748 1/2011
KR 20160022435 A * 3/2016 ........... G02B 6/0083

OTHER PUBLICATIONS

Park, Display device and method for fabricating the same, Mar. 2, 2016, KR Publication of Application KR20140107731A; Google Patents, https://patents.google.com/patent/KR20160022435A/en.*

*Primary Examiner* — Elmito Breval
*Assistant Examiner* — Michael Chiang
(74) *Attorney, Agent, or Firm* — K&L Gates LLP (57) ABSTRACT

A display device includes a display panel provided with a display surface on which an image is displayed, a back light provided below the display panel, a first frame provided with a first edge enclosing the display surface above the display panel and a first side plate portion provided on the first edge so as to extend in a direction orthogonal to the display surface, and a second frame provided with a second edge enclosing a light transmissive surface of the back light and a second side plate portion provided on the second edge to be opposed to an inner surface of the first side plate portion. The first side plate portion includes a first projection, and the second side plate portion includes a cut-away section in a position opposed to the first projection.

8 Claims, 8 Drawing Sheets

(56) References Cited

U.S. PATENT DOCUMENTS

| | | | |
|---|---|---|---|
| 2010/0188597 A1* | 7/2010 | Koike | G02F 1/133308 349/58 |
| 2011/0063541 A1* | 3/2011 | Oh | G02F 1/133308 349/58 |
| 2011/0260959 A1* | 10/2011 | Son | G02F 1/133308 345/102 |
| 2012/0023654 A1 | 2/2012 | Bowcutt | |
| 2012/0236541 A1 | 9/2012 | Chen | |
| 2016/0057872 A1* | 2/2016 | Park | G02B 6/0083 362/611 |

* cited by examiner

DISPLAY DEVICE HAVING FRAMES

CROSS REFERENCES TO RELATED APPLICATIONS

The present application claims priority to Japanese Priority Patent Application JP 2014-235800 filed in the Japan Patent Office on Nov. 20, 2014, and Japanese Priority Patent Application JP2015-226097 filed in the Japan Patent Office on Nov. 18, 2015, the entire content of which is hereby incorporated by reference.

BACKGROUND

The present invention relates to a display device in which a first frame is fixed to a second frame.

Following Japanese Patent Application Laid-open Publication No. 2011-2748 (JP-A-2011-2748) discloses a liquid crystal display device including a liquid crystal display panel, a back light, a lower frame which houses the back light, and an upper frame arranged so as to cover the liquid crystal panel and the lower frame. In the liquid crystal display device discussed in JP-A-2011-2748, the upper and lower frames are fit to be fixed to each other, and the liquid crystal display device and the back light are incorporated between the upper and lower frames.

Each of the upper and lower frames includes side walls on four sides thereof and an inner surface of a side wall of the upper frame is opposed to an outer surface of a side wall of the lower frame. Two claws are provided on each side wall of the four sides of the upper frame, and each claw is bent toward the side wall of the lower frame. An opening is formed in a position opposed to each claw on the side wall of the lower frame. The claw of the upper frame is engaged with the opening of the lower frame, so that the upper frame is fixed to the lower frame.

However, in the liquid crystal display device discussed in JP-A-2011-2748, the side wall of the upper frame is opposed to the side wall of the lower frame on a lower portion of the opening of the lower frame, and a gap between the side wall of the upper frame and the side wall of the lower frame is small. Therefore, at the time of manufacturing or reworking, when the upper frame is detached from the lower frame after the upper frame and the lower frame are fit to be fixed to each other, there is no sufficient gap for a tool for detaching to be inserted between the side wall of the upper frame and the side wall of the lower frame. Therefore, it might be difficult to detach the upper frame from the lower frame.

For the foregoing reasons, there is a need for a display device in which an upper frame can be easily detached from a lower frame at the time of manufacturing of or reworking on the display device.

SUMMARY

According to an aspect, A display device includes a display panel provided with a display surface on which an image is displayed, a back light provided below the display panel, a first frame provided with a first edge enclosing the display surface above the display panel and a first side plate portion provided on the first edge so as to extend in a direction orthogonal to the display surface, and a second frame provided with a second edge enclosing a light transmissive surface of the back light and a second side plate portion provided on the second edge to be opposed to an inner surface of the first side plate portion, wherein the first side plate portion includes a first projection projecting toward the second side plate portion, the second side plate portion includes a cut-away section opening toward a lower portion of the second side plate portion in a position opposed to the first projection, and a lower surface of an inner peripheral surface of the cut-away section is opposed to an upper surface of the first projection.

Additional features and advantages are described herein, and will be apparent from the following Detailed Description and the figures.

DETAILED DESCRIPTION

A mode for carrying out the present invention (embodiment) will be described in detail with reference to the drawings. The present invention is not limited to contents described in the following embodiment. Components described below include a component that can be easily conceived by those skilled in the art, a component that is substantially identical thereto. Furthermore, the components described below may be appropriately combined. The disclosure is merely an example and an appropriate modification without departing from the gist of the present invention which can be conceived by those skilled in the art is naturally included in the scope of the present invention. Width, thickness, a shape and the like of each unit may be schematically illustrated as compared to those of an actual mode in the drawings in order to make the illustration clearer; however, this is merely an example and this does not limit the interpretation of the present invention. In the specification and drawings, the same reference numeral may be assigned to a component similar to that which has already been described with reference to an already presented drawing, and the detailed description thereof may be appropriately omitted.

Figure 1:
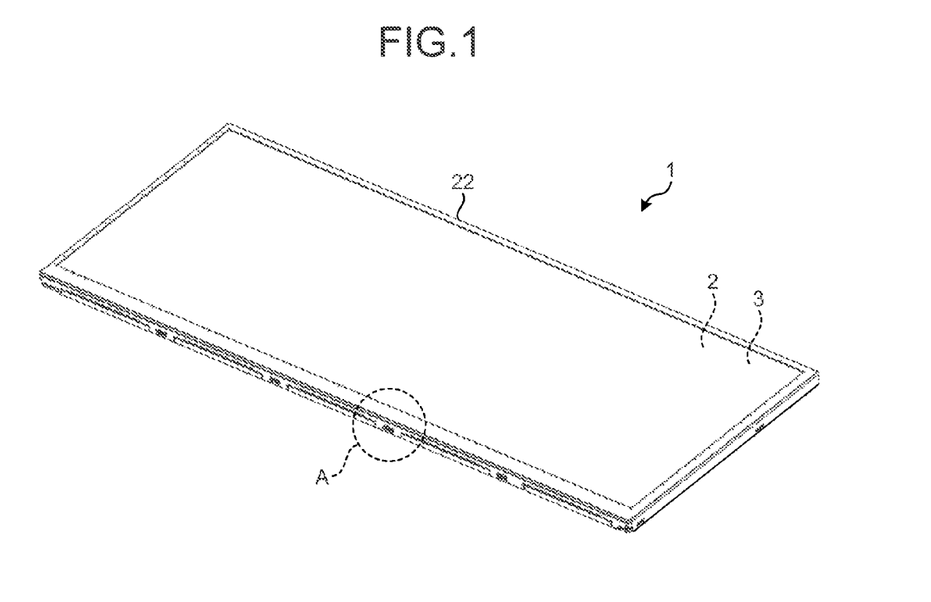
FIG. 1 is a perspective view of a display device according to an embodiment.
Figure 2:
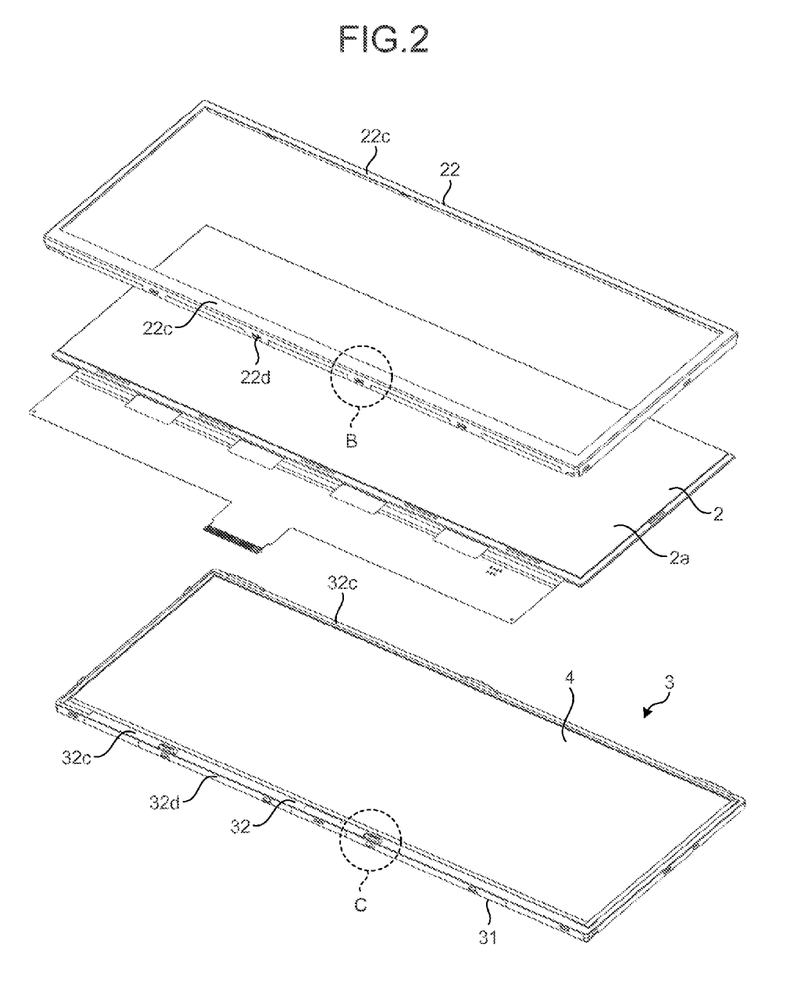
FIG. 2 is an exploded perspective view of the display device according to the embodiment.

FIG. 1 is a perspective view of a display device according to an embodiment. FIG. 2 is an exploded perspective view of the display device according to the embodiment. A display device 1 according to the embodiment includes a display panel 2 provided with a display surface 2a on which an image is displayed, a back light unit 3 provided under the display panel 2, and a first frame (upper frame) 22 which protects the display surface 2a of the display panel 2.

The display panel 2 is a liquid crystal panel. The display panel 2 is provided with a pixel substrate, a counter substrate arranged to be opposed to the pixel substrate in a direction perpendicular to a surface thereof, and a liquid crystal layer interposed between the pixel substrate and the counter substrate. The pixel substrate arranged so as to correspond to pixels is provided with a plurality of pixel electrodes arranged in a matrix pattern, and a common electrode. A color filter is provided on either one of the pixel substrate and the counter substrate. The color filter is configured such that filters of three colors of red (R), green (G), and blue (B) are periodically arranged and the three colors of R, G, and B, as one unit, are associated with each pixel, for example.

The display panel 2 displays an image on the display surface 2a by driving the liquid crystal layer based on an image signal to switch between transmission and shielding of light in each pixel. The display panel 2 according to the embodiment is, for example, a display panel in a horizontal field mode such as an in-plane switching (IPS), and liquid crystal suitable to the display panel is used in the liquid crystal layer. The display panel 2 is not limited to the display panel in the horizontal field mode, and a display panel in a vertical field mode may also be used. The liquid crystal forming the liquid crystal layer may also be appropriately changed according to a display panel. For example, the liquid crystal used in the liquid crystal layer may be liquid crystal in various modes such as a twisted nematic (TN) mode, a vertical alignment (VA) mode, and an electrically controlled birefringence (ECB) mode.

As illustrated in FIG. 2, the first frame 22 is provided with a first edge 22c enclosing the display surface 2a above the display panel 2, and a first side plate portion 22d provided on the first edge 22c so as to extend in a direction orthogonal to the display surface 2a. The first edge 22c has a rectangular shape in a planer view, and the first side plate portion 22d is provided on each side of the first edge 22c. The first side plate portions 22d may also be provided on at least two opposed sides of the first edge 22c. The first side plate portion 22d of the first frame 22 is fixed to the back light unit 3, and the display panel 2 and the back light unit 3 are incorporated inside the first side plate portions 22d. A shape of a portion in which the first frame 22 and the back light unit 3 are fixed to each other will be described below.

The back light unit 3 includes a back light 4 which emits light to the display panel 2, a case 31 which houses the back light 4, and a second frame (lower frame) 32 provided so as to cover the case 31. The back light 4 includes, for example, a light source which outputs the light, a light guide plate which emits the light from the light source to the display panel 2, and an optical sheet stacked on the light guide plate. The back light 4 is not especially limited and a known one is used.

The case 31 is a rectangular box-shaped case including a bottom surface, a side wall provided on an outer periphery of the bottom surface, and an upper opening. The back light 4 is fixed to the bottom surface of the case 31. The case 31 serves as a light shielding member which shields the light emitted from the back light 4 so as to prevent the light from leaking outside. The case 31 is a case made of metal or resin.

The second frame 32 is provided so as to cover the case 31, and the display panel 2 is stacked above the second frame 32. As illustrated in FIG. 2, the second frame 32 includes a second edge 32c enclosing a light transmissive surface of the back light 4, and a second side plate portion 32d provided on the second edge 32c so as to extend in a direction orthogonal to the light transmissive surface of the back light 4. The second edge 32c has a rectangular shape in a planer view, and the second side plate portion 32d is provided on each side of the second edge 32c. The second side plate portions 32d may also be provided on at least two opposed sides of the second edge 32c. The case 31 is arranged inside the second side plate portions 32d, and an upper portion of the side wall of the case 31 is bonded to a lower surface of the second edge 32c.

The second frame 32 is fixed to an inner side of the first frame 22, and the display panel 2 and the back light unit 3 are integrally fixed to each other as illustrated in FIG. 1.

Figure 3:
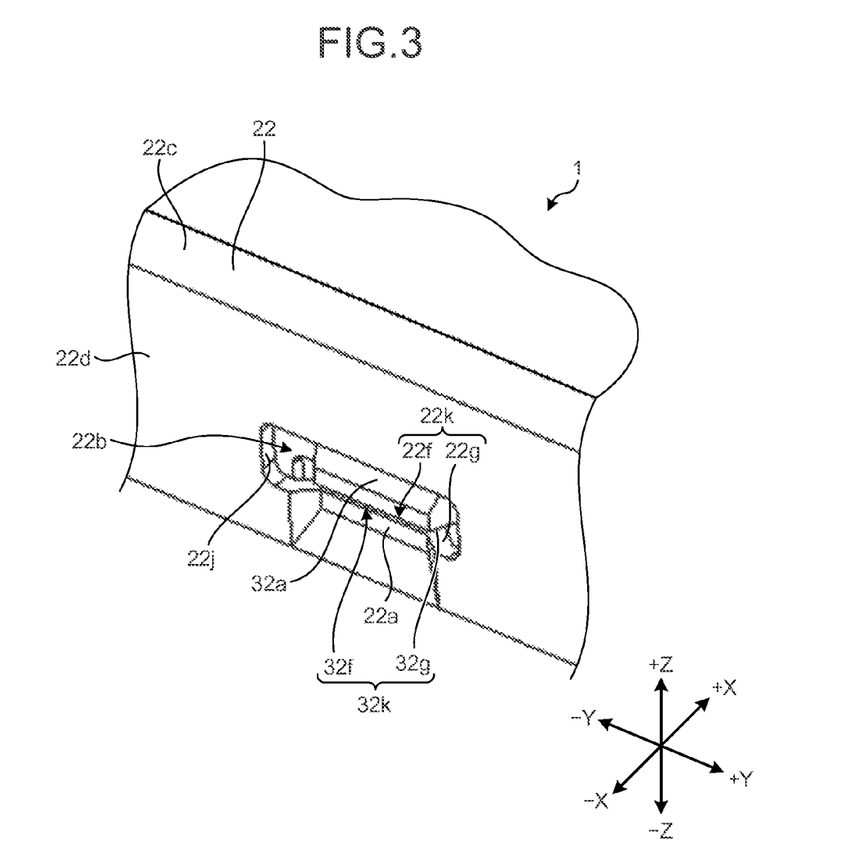
FIG. 3 is a partial enlarged perspective view of a region A enclosed by a dotted line in FIG. 1.
Figure 4:
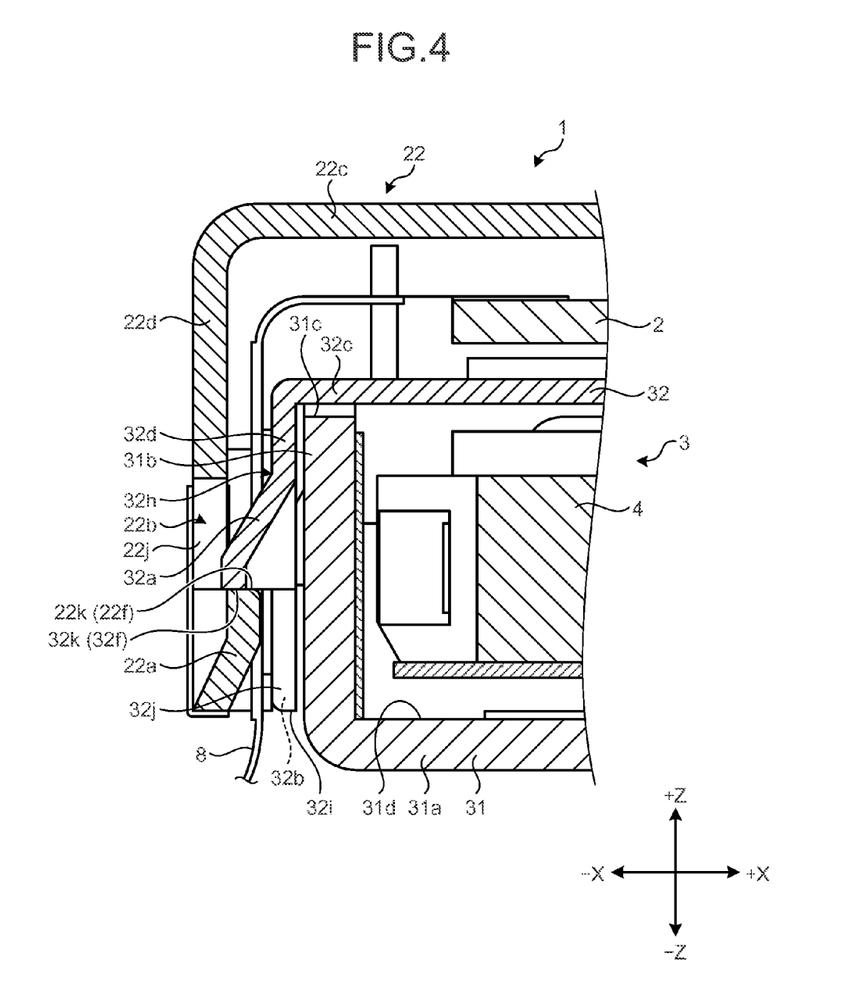
FIG. 4 is a partial enlarged cross-sectional view of a portion in which first and second frames are fixed to each other illustrated in FIG. 3.
Figure 5:
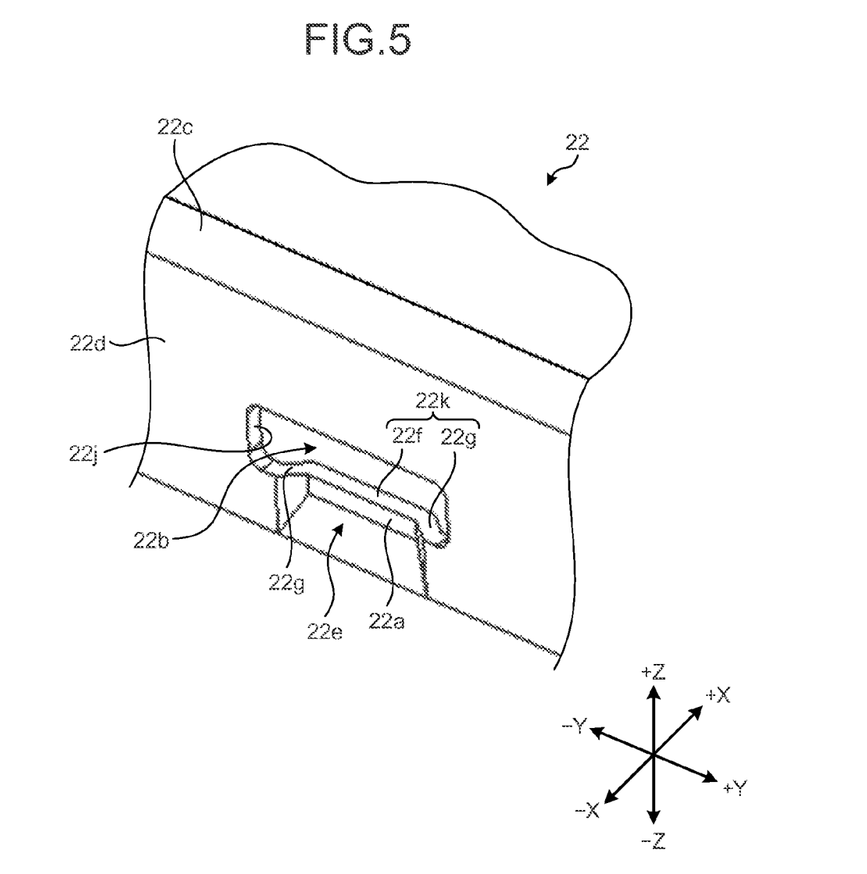
FIG. 5 is a partial enlarged perspective view of the first frame illustrating a region B enclosed by a dotted line in FIG. 2 in an enlarged manner.
Figure 6:
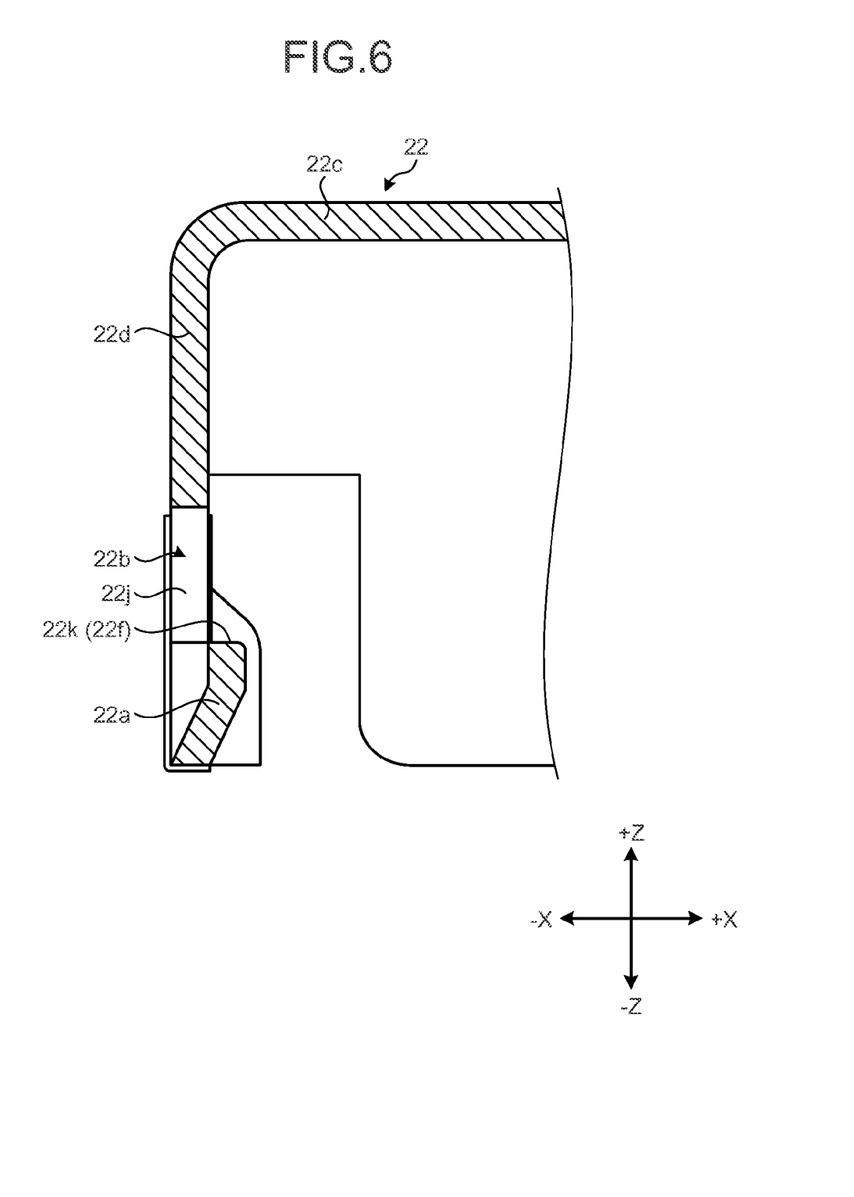
FIG. 6 is a partial enlarged cross-sectional view of a site in which a first projection of the first frame is provided.
Figure 7:
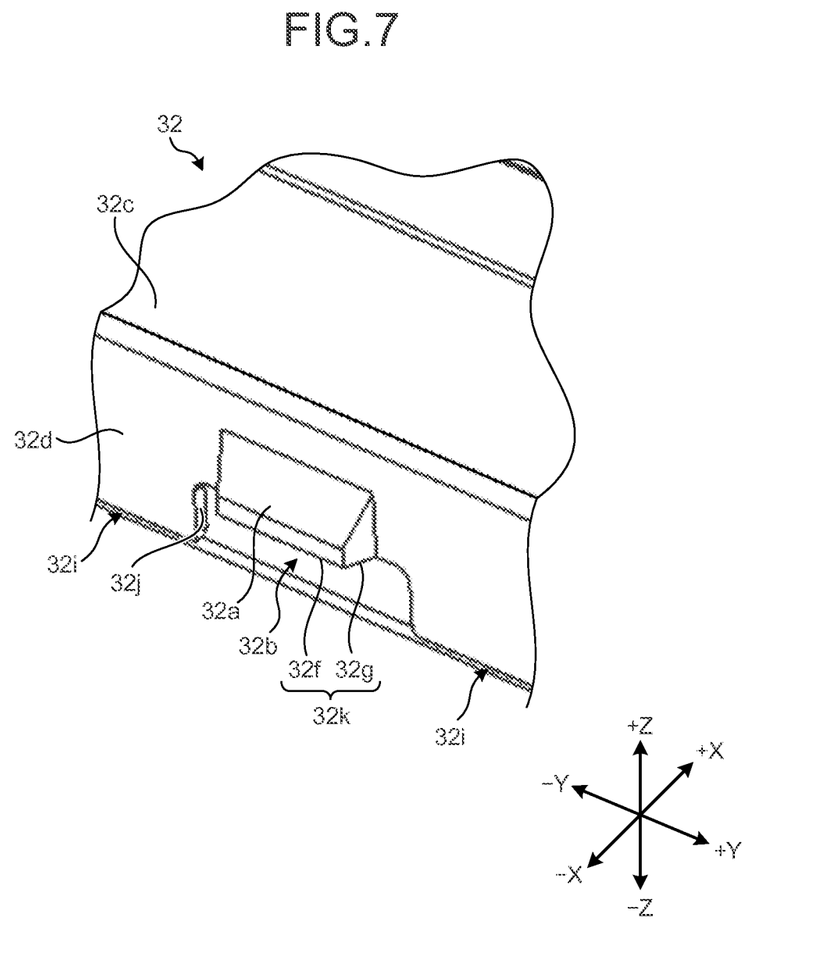
FIG. 7 is a partial enlarged perspective view of the second frame illustrating a region C enclosed by a dotted line in FIG. 2 in an enlarged manner.
Figure 8:
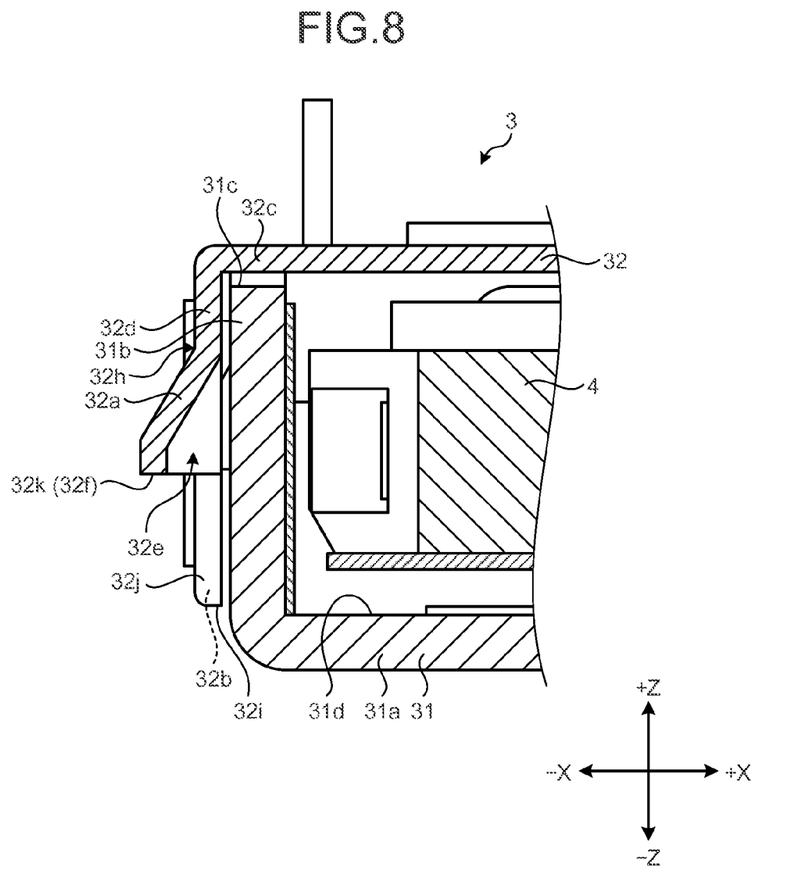
FIG. 8 is a partial enlarged cross-sectional view of a site in which a second projection of the second frame is provided.

Hereinafter, a structure of a portion in which the first and second frames 22 and 32 are fixed to each other is described. FIG. 3 is a partial enlarged perspective view of a region A enclosed by a dotted line in FIG. 1, and FIG. 4 is a partial enlarged cross-sectional view of the portion in which the first and second frames are fixed to each other illustrated in FIG. 3. FIG. 5 is a partial enlarged perspective view of the first frame illustrating a region B enclosed by a dotted line in FIG. 2 in an enlarged manner, and FIG. 6 is a partial enlarged cross-sectional view of a site in which a first projection of the first frame illustrated in FIG. 5 is provided. FIG. 7 is a partial enlarged perspective view of the second frame illustrating a region C enclosed by a dotted line in FIG. 2 in an enlarged manner, and FIG. 8 is a partial enlarged cross-sectional view of a site in which a second projection of the second frame illustrated in FIG. 7 is provided.

As illustrated in FIGS. 4 and 6, the first side plate portion 22d of the first frame 22 includes a first projection 22a projecting toward the second side plate portion 32d. The first side plate portion 22d is provided with an opening 22b, and an inner peripheral surface 22j of the opening 22b is continuous to an upper surface 22k of the first projection 22a.

In the embodiment, the first frame 22 is made of metal, and the first projection 22a is formed by applying pressure to the flat first side plate portion 22d from an outer surface side thereof to deform the first side plate portion 22d into a concave shape. More specifically, as illustrated in FIG. 5, a first concave portion 22e is formed on an outer surface of the first side plate portion 22d in a site corresponding to the first projection 22a. The first projection 22a projects from an inner surface of the first side plate portion 22d toward the inside of the first frame 22 in "+X" direction. The first concave portion 22e is formed to be recessed from an outer surface of the first side plate portion 22d in "+X" direction. As illustrated in FIG. 5, the upper surface 22k of the first projection 22a includes a first main surface 22f extending in a direction substantially parallel to the first side plate portion 22d, and a first connecting surface 22g connecting the first main surface 22f to the first side plate portion 22d. Two first connecting surfaces 22g are provided on both sides of the first main surface 22f so as to be inclined with respect to the extending direction of the first main surface 22f. As illustrated in FIG. 5, the first main surface 22f and the first connecting surface 22g are continuous to the inner peripheral surface 22j of the opening 22b.

The opening 22b is wider than the first projection 22a. As a result, when pressure is applied to the flat first side plate portion 22d, the first side plate portion 22d is easily deformed in the vicinity of the opening 22b, and the first projection 22a can be easily formed with high accuracy.

As illustrated in FIGS. 4 and 8, the second side plate portion 32d of the second frame 32 includes a second projection 32a projecting toward the first side plate portion 22d. As illustrated in FIGS. 4 and 7, the second side plate portion 32d is provided with a cut-away section 32b in a position opposed to the first projection 22a. The cut-away section 32b opens at a lower portion of the second side plate portion 32*d*, and a lower surface 32*k* of the second projection 32*a* is continuous to an inner peripheral surface 32*j* of the cut-away section 32*b*.

The second projection 32*a* is formed, similarly to the first projection 22*a*, by applying pressure to the flat second side plate portion 32*d* from an inner surface side thereof to deform the second side plate portion 32*d*. Therefore, a second concave portion 32*e* is formed on an inner surface of the second side plate portion 32*d* in a site corresponding to the second projection 32*a*. The second projection 32*a* projects from an outer surface of the second side plate portion 32*d* toward the outside of the second frame 32 in "−X" direction. The second concave portion 32*e* is formed to be recessed from an inner surface of the second side plate portion 32*d* in "−X" direction. The lower surface 32*k* of the second projection 32*a* includes a second main surface 32*f* extending in a direction substantially parallel to the second side plate portion 32*d*, and a second connecting surface 32*g* connecting the second main surface 32*f* to the second side plate portion 32*d*. Two second connecting surfaces 32*g* are provided on both sides of the second main surface 32*f* so as to be inclined with respect to the extending direction of the second main surface 32*f*.

As illustrated in FIG. 7, the inner peripheral surface 32*j* of the cut-away section 32*b* continues to the lower surface 32*k* of the second projection 32*a*, and the second main surface 32*f* and the second connecting surface 32*g* of the second projection 32*a* are flush with a lower surface of the inner peripheral surface 32*j* of the cut-away section 32*b*. The cut-away section 32*b* is wider than the second projection 32*a*. As a result, the flat second side plate portion 32*d* is easily deformed, and the second projection 32*a* can be easily formed with high accuracy.

As illustrated in FIGS. 4 and 8, the case 31 includes a bottom portion 31*a* and a side wall 31*b* that is provided on an outer periphery of the bottom portion 31*a*. The side wall 31*b* extends upward from the bottom portion 31*a*, and is opposed to an inner surface of the second side plate portion 32*d*. At least a portion of the side wall 31*b* that overlaps the second projection 32*a* has a flat plate shape, and no projection or opening is provided therein. An upper end portion 31*c* of the side wall 31*b* is positioned above a boundary 32*h* between the second projection 32*a* and the second side plate portion 32*d*. The second edge 32*c* of the second frame 32 is fixed to the upper end portion 31*c* of the side wall 31*b*. A lower surface 32*i* of the second side plate portion 32*d* is positioned above an upper surface 31*d* of the bottom portion 31*a*. The boundary 32*h* between the second projection 32*a* and the second side plate portion 32*d* is a portion where the second side plate portion 32*d* is joined to an inclined surface of an upper side of the second projection 32*a*.

Next, a mode of fitting of the first and second frames 22 and 32 is described. First, as illustrated in FIG. 8, the back light unit 3 obtained by bonding the case 31 housing the back light 4 therein and the second frame 32 to be fixed to each other is prepared. Then, the display panel 2 is stacked above the second frame 32 as illustrated in FIG. 4. Next, the first frame 22 is fit to the second frame 32 such that an inner surface of the first side plate portion 22*d* is opposed to an outer surface of the second side plate portion 32*d*.

In this case, an inclined surface on a lower side of the first projection 22*a* abuts an inclined surface on an upper side of the second projection 32*a*, such that they are pressed against each other in opposite directions. The first frame 22 is fit to the second frame 32 with the first projection 22*a* elastically deformed toward the first side plate portion 22*d*, and the second projection 32*a* elastically deformed toward the second side plate portion 32*d*. When the first projection 22*a* is fit to a position opposed to the cut-away section 32*b* of the second side plate portion 32*d*, the elastically deformed first projection 22*a* returns to its original state. At the same time, the second projection 32*a* is arranged so as to face the opening 22*b* of the first side plate portion 22*d*, and the elastically deformed second projection 32*a* returns to its original state. As illustrated in FIGS. 4 and 5, a part of the second projection 32*a* is arranged in a position overlapping with the opening 22*b* of the first side plate portion 22*d*. As a result, the first main surface 22*f* of the first projection 22*a* abuts the second main surface 32*f* of the second projection 32*a*, and the first and second frames 22 and 32 are fit to be fixed to each other. As described above, the display panel 2 and the back light unit 3 are integrally incorporated inside the first frame 22, and the display device 1 illustrated in FIG. 1 is formed. Although the first main surface 22*f* of the first projection 22*a* abuts the second main surface 32*f* of the second projection 32*a* as illustrated in FIG. 4 according to the embodiment, configuration of the display device 1 is not limited thereto, and a clearance may be provided between the opposed first and second projections 22*a* and 32*a*.

In the display device 1 of the embodiment, the first side plate portion 22*d* includes the first projection 22*a* projecting toward the second side plate portion 32*d*. The upper surface 22*k* of the first projection 22*a* includes the first main surface 22*f* extending in the direction parallel to the first side plate portion 22*d*, and the first connecting surface 22*g* connecting the first main surface 22*f* to the first side plate portion 22*d* provided so as to be inclined with respect to the extending direction of the first main surface 22*f*. Similarly, the lower surface 32*k* of the second projection 32*a* includes the second main surface 32*f* extending in the direction parallel to the second side plate portion 32*d*, and the second connecting surface 32*g* connecting the second main surface 32*f* to the second side plate portion 32*d* provided so as to be inclined with respect to the extending direction of the second main surface 32*f*.

As a result, even when the second frame 32 is made of thin metal, for example, the first connecting surface 22*g* of the first projection 22*a* abuts the second connecting surface 32*g* of the second projection 32*a*. Therefore, an area in which the lower surface 32*k* of the second projection 32*a* abuts the upper surface 22*k* of the first projection 22*a* becomes larger, and fitting strength of the first and second frames 22 and 32 is ensured. Even when an interval between the first and second side plate portions 22*d* and 32*d* deviates, the first connecting surface 22*g* of the first projection 22*a* surely abuts the second connecting surface 32*g* of the second projection 32*a*, so that the fitting strength of the first and second frames 22 and 32 is ensured.

As illustrated in FIG. 4, the display panel 2 is arranged between the first frame 22 and the second frame 32 above the back light 4. A flexible substrate 8 is connected to the display panel 2, and the display panel 2 and an external circuit (e.g., integrated circuit (IC), not illustrated in FIG. 4) are connected to each other through the flexible substrate 8. The flexible substrate 8 is led out through the interval between the first and second side plate portions 22*d* and 32*d* in a site in which the first and second projections 22*a* and 32*a* are not provided. Therefore, the first and second side plate portions 22*d* and 32*d* are fixed to each other with a predetermined interval therebetween. According to the display device 1 of the embodiment, the first and second projections 22*a* and 32*a* are provided so as to project in directions to face each other. Therefore, even when there is the interval between the first and second side plate portions

22*d* and 32*d*, the area in which the first projection 22*a* abuts the second projection 32*a* is ensured, so that the fitting strength of the first and second frames 22 and 32 is ensured.

Next, a mode of detaching the first frame 22 from the second frame 32 is described. In a step of manufacturing the display device 1, the first frame 22 is detached from the second frame 32 in some cases, after the first frame 22 is fit to the second frame 32. In this case, a tool for detaching is inserted into a gap between the first projection 22*a* and the side wall of the case 31 illustrated in FIG. 4. In the embodiment, the second side plate portion 32*d* is provided with the cut-away section 32*b* in the position opposed to the first projection 22*a*, and the tool for detaching is inserted into the cut-away section 32*b*. Then, the first projection 22*a* is elastically deformed to an outer side of the second projection 32*a* by the tool for detaching. At this time, the first side plate portion 22*d* is also elastically deformed outside together with the first projection 22*a*. In a state in which the first projection 22*a* is elastically deformed, the first frame 22 is moved upward to be detached from the second frame 32. After the first frame 22 is detached from the second frame 32, the first projection 22*a* returns to its original state.

In the display device 1 of the embodiment, the second side plate portion 32*d* is provided with the cut-away section 32*b* in the position opposed to the first projection 22*a*, and the cut-away section 32*b* opens at the lower portion of the second side plate portion 32*d*. Therefore, the interval between the first projection 22*a* and the case 31 can be made larger. Therefore, when the first frame 22 is detached from the second frame 32, a space into which the tool for detaching is inserted is ensured, and the first projection 22*a* is easily deformed. Therefore, the first frame 22 can be easily detached from the second frame 32. According to the embodiment, it is possible to prevent stress from being applied to a site other than the first projection 22*a* (case 31, second side plate portion 32*d* and the like) when the tool for detaching is inserted, as compared to a case in which the cut-away section 32*b* is not provided. Therefore, deformation of the site other than the first projection 22*a* and damage to the first frame 22 are prevented when the first frame 22 is detached.

As illustrated in FIG. 1, the first frame 22 has the rectangular shape with two long sides opposed to each other in a planer view and two short sides opposed to each other. It is preferable that the first and second projections 22*a* and 32*a* are provided on at least one of the long sides. Since the deformation easily occurs in the long side as compared to the short side of the first frame 22, the fitting strength of the first and second frames 22 and 32 is ensured by providing the first and second projections 22*a* and 32*a* on the long side. Although the region A enclosed by the dotted line in FIG. 1 has been described according to the embodiment, the first and second projections 22*a* and 32*a* may be appropriately provided in a plurality of sites.

Although the case in which the display device 1 of the embodiment is provided with both the first and second projections 22*a* and 32*a* has been described, configuration of the display device 1 is not limited thereto. For example, the display device 1 may be configured such that the first side plate portion 22*d* is provided with the first projection 22*a*, and the second side plate portion 32*d* is not provided with the second projection 32*a* but includes the cut-away section 32*b* formed in the position opposed to the first projection 22*a*. In this case, an upper surface of the cut-away section 32*b* abuts the upper surface 22*k* of the first projection 22*a*, and the first and second frames 22 and 32 are fit to be fixed to each other. Even in such a mode, the upper surface 22*k* of the first projection 22*a* includes the first main surface 22*f* and the first connecting surface 22*g* provided so as to be inclined with respect to the first main surface 22*f*, so that the fitting strength of the first projection 22*a* and the cut-away section 32*b* is ensured. Further, even when the first frame 22 is detached, the cut-away section 32*b* opens at the lower portion of the second side plate portion 32*d*, so that the space between the inclined surface on the lower side of the first projection 22*a* and the case 31 is ensured. Therefore, the tool for detaching is inserted into the space of the cut-away section 32*b*, and the first projection 22*a* is easily deformed.

As described above, the display device 1 of the embodiment includes the display panel 2 provided with the display surface 2*a* on which the image is displayed, the back light 4 provided below the display panel 2, the first frame 22 provided with the first edge 22*c* enclosing the display surface 2*a* above the display panel 2 and the first side plate portion 22*d* provided on the first edge 22*c* so as to extend in the direction orthogonal to the display surface 2*a*, and the second frame 32 provided with the second edge 32*c* enclosing the light transmissive surface of the back light 4 and the second side plate portion 32*d* provided on the second edge 32*c* to be opposed to the inner surface of the first side plate portion 22*d*. The first side plate portion 22*d* includes the first projection 22*a* projecting toward the second side plate portion 32*d*. The second side plate portion 32*d* includes the cut-away section 32*b* opening at the lower portion of the second side plate portion 32*d* in the position opposed to the first projection 22*a*. The lower surface of the inner peripheral surface 32*j* of the cut-away section 32*b* is opposed to the upper surface 22*k* of the first projection 22*a*.

According to the display device 1 of the embodiment, the second side plate portion 32*d* is provided with the cut-away section 32*b*, and the interval between the first projection 22*a* and the case 31 can be made larger. Therefore, when the first frame 22 is detached from the second frame 32, a space into which the tool for detaching is inserted is ensured, and the first projection 22*a* is easily deformed. Therefore, the first frame 22 can be easily detached from the second frame 32.

In the display device 1 of the embodiment, the upper surface 22*k* of the first projection 22*a* includes the first main surface 22*f* extending in the direction substantially parallel to the first side plate portion 22*d*, and the first connecting surface 22*g* connecting the first main surface 22*f* to the first side plate portion 22*d*. As a result, even when the second frame 32 is made of thin metal, for example, the first connecting surface 22*g* of the first projection 22*a* abuts the lower surface of the cut-away section 32*b*. Therefore, the area in which the first projection 22*a* abuts the lower surface of the cut-away section 32*b* becomes larger, and the fitting strength of the first and second frames 22 and 32 is ensured.

In the display device 1 of the embodiment, the second side plate portion 32*d* is provided with the second projection 32*a* projecting toward the first side plate portion 22*d*, and the lower surface 32*k* of the second projection 32*a* is continuous to the inner peripheral surface 32*j* of the cut-away section 32*b*. According to this configuration, the first projection 22*a* abuts the second projection 32*a*, and the fitting strength of the first and second frames 22 and 32 is ensured. Further, the interval between the first projection 22*a* and the case 31 can be made larger. Therefore, when the first frame 22 is detached from the second frame 32, the space into which the tool for detaching is inserted is ensured, so that the first frame 22 can be easily detached from the second frame 32.

The lower surface 32*k* of the second projection 32*a* includes the second main surface 32*f* extending in the direction substantially parallel to the second side plate portion 32d, and the second connecting surface 32g connecting the second main surface 32f to the second side plate portion 32d. According to this configuration, the first connecting surface 22g of the first projection 22a surely abuts the second connecting surface 32g of the second projection 32a, so that the fitting strength of the first and second frames 22 and 32 is ensured.

In the embodiment, the cut-away section 32b is formed to be wider than the second projection 32a. As a result, when the second projection 32a is formed, the second side plate portion 32d in the vicinity of the cut-away section 32b is easily deformed, and the second projection 32a can be easily formed.

In the embodiment, the opening 22b is formed on the first side plate portion 22d, and the inner peripheral surface 22j of the opening 22b is continuous to the upper surface 22k of the first projection 22a. According to this configuration, the second projection 32a can be fit to the first projection 22a in a position partially overlapping with the opening 22b, and the fitting strength of the first and second frames 22 and 32 is improved.

In the embodiment, the opening 22b is formed to be wider than the first projection 22a. As a result, when the first projection 22a is formed, the first side plate portion 22d in the vicinity of the opening 22b is easily deformed, and the first projection 22a can be easily formed.

In the embodiment, the first frame 22 has the rectangular shape with the two long sides opposed to each other in a planer view and the two short sides opposed to each other, and the first projection 22a is provided on at least one of the long sides. Since the deformation easily occurs in the long side as compared to the short side of the first frame 22, the fitting strength of the first and second frames 22 and 32 is ensured by providing the first and second projections 22a and 32a on the long side.

Although a preferred embodiment of the present invention has been described above, the present invention is not limited to such embodiment. The contents disclosed in the embodiment are merely an example, and various modifications may be made without departing from the gist of the present invention. An appropriate modification without departing from the gist of the present invention naturally belongs to the technical range of the present invention.

For example, although the display panel 2 is illustrated as a display unit of the display device 1 in the embodiment, the unit is not limited thereto, and an organic electro-luminescence (OEL) display and a micro electro mechanical system (MEMS), for example, may be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
   a display panel provided with a display surface on which an image is displayed;
   a back light provided below the display panel;
   a first frame provided with a first edge enclosing the display surface above the display panel, and a first side plate portion provided on the first edge so as to extend in a direction orthogonal to the display surface;
   a second frame provided with a second edge enclosing a light transmissive surface of the back light, and a second side plate portion provided on the second edge to be opposed to an inner surface of the first side plate portion; and
   a case that houses the back light, the case including
      a bottom plate having an upper surface, and
      a case side wall having a flat plate shape and extending upward from the bottom plate, the case side wall being opposed to an inner surface of the second side plate portion,
   wherein
   the first side plate portion includes a first projection projecting toward the second side plate portion,
   an upper surface of the first projection includes:
      a first main surface that is longitudinal in a first direction in which the first side plate portion extends, when viewed from a vertical direction to the display surface; and
      first connecting surfaces that are provided on both sides of the first main surface to be inclined with respect to the first direction, when viewed from the vertical direction,
   the first main surface is connected to the first side plate portion by the first connecting surfaces,
   the second side plate portion includes:
      a cut-away section opening toward a lower portion of the second side plate portion in a position opposed to the first projection,
      a lower facing surface of the cut-away section is opposed to the first main surface of the first projection, and
      a lower end surface that is a surface of a lower end of the second side plate portion where no cut-away section is provided,
   the lower end surface of the second side plate portion is positioned above the upper surface of the bottom plate, and
   the second edge is fixed to an upper end portion of the case side wall that has no openings and no projections.

2. The display device according to claim 1, wherein the second side plate portion is provided with a second projection projecting toward the first side plate portion,
   the cut-away section is provided below the second projection, and
   an inner peripheral surface of the cut-away section is continuous to a lower surface of the second projection and to the lower end surface of the second side plate portion.

3. The display device according to claim 2, wherein the lower surface of the second projection includes:
   a second main surface that is longitudinal in the first direction, when viewed from the vertical direction; and
   second connecting surfaces that are provided on both sides of the second main surface to be included with respect to the first direction, when viewed from the vertical direction,
   the second main surface of the second projection is opposed to the first main surface of the first projection.

4. The display device according to claim 2, wherein the cut-away section is wider than the second projection.

5. The display device according to claim 2, wherein an upper end portion of the case side wall is positioned above a position of the second projection on which the second projection starts projecting from the second side plate portion toward the first plate portion.

6. The display device according to claim 1, wherein the first side plate portion is provided with an opening, and an inner peripheral surface of the opening is continuous to the upper surface of the first projection.

7. The display device according to claim 6, wherein the opening is wider than the first projection.

8. The display device according to claim 1, wherein the first frame has a rectangular shape with two long sides opposed to each other in a planer view and two short sides opposed to each other, and the first projection is provided on at least one of the two long sides.

* * * * *